INVENTOR.
Alfred A. Letourneur
BY
*L. S. Saulsbury*
ATTORNEY

United States Patent Office 2,981,546
Patented Apr. 25, 1961

2,981,546
VEHICLE UNDERCARRIAGE FACILITATING THE LIFTING OF THE VEHICLE OVER CURBS AND STEPS
Alfred A. Letourneur, 19 W. 85th St., New York, N.Y.
Filed Oct. 9, 1958, Ser. No. 766,337
2 Claims. (Cl. 280—5.28)

The present invention relates to an undercarriage for hand pushed vehicles, such as hand carts, baby carriages, invalid chairs, and the like, and more particularly to an undercarriage which will facilitate the lifting of such vehicles up over sidewalk curbs and steps.

Attempts have been made to construct hand pushed vehicles, particularly baby carriages so that they can be pushed up over curbs and up steps. However, all of such type of vehicles now on the market still require tremendous effort on the part of the person pushing the vehicle to get the vehicle over any step or obstacle. While many attempts have been made to overcome the foregoing disadvantages with regard to such vehicles, none have been entirely successful when carried into practice.

It is thus the principal object of the present invention to provide an undercarriage for hand-pushed vehicles so that the vehicle can be easily and readily pushed over curbs and up steps.

Another object of the invention is to provide a vehicle undercarriage of this type which can be easily constructed or readily assembled.

Other objects and advantages will become apparent from the following description.

Broadly stated, the present invention contemplates a vehicle undercarriage having a frame and front and rear crank axles that are interconnected. The axles used may either traverse the full width of the frame, or partly traverse said width and be housed at the sides of the frame. In either event, the axles are either formed of double or single cranks. The wheels are journalled on the crank arms and may be so disposed that the front and rear sets of wheels laterally overlie each other. The axles are resiliently connected by return or counter balance springs that tend to maintain the crank axles substantially parallel to the horizontal plane of the frame. A parallelogram linkage is connected between the front and rear axles, said parallelogram link arrangement defining a plane at right angles to the horizontal plane defined by said frame.

The invention will appear more clearly from the following detailed description taken in connection with the accompanying drawing, showing by way of example, a preferred embodiment of the inventive idea.

Figure 1:
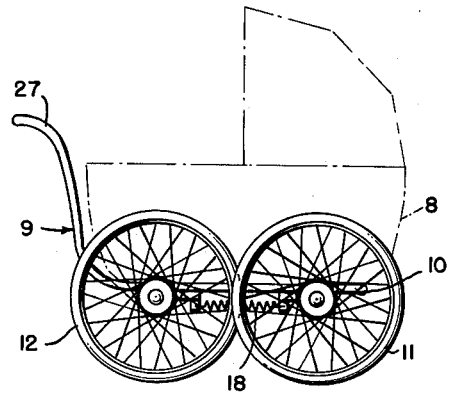
Figure 2:
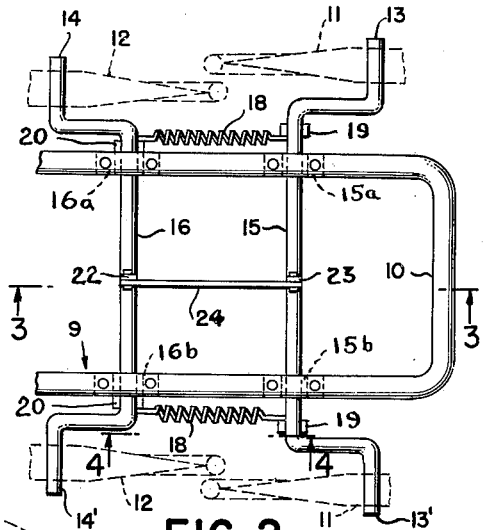
Figure 3:
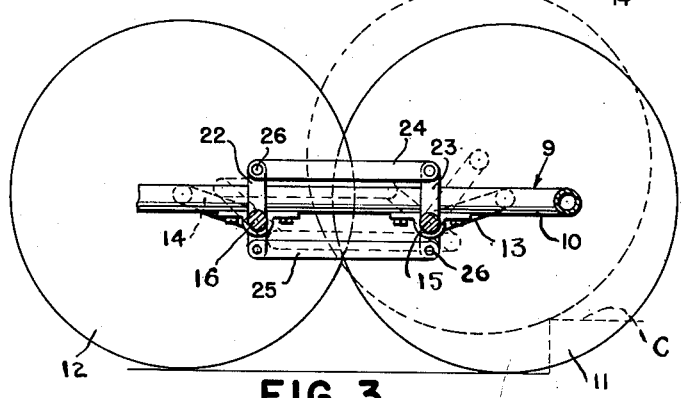
Figure 4:
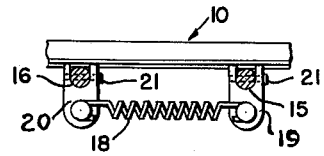
Figure 6:
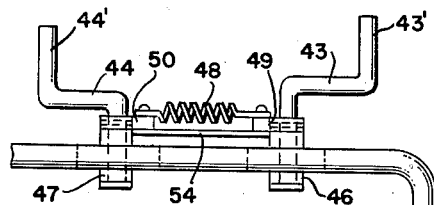
Figure 5:
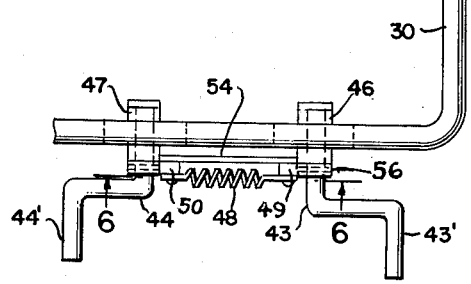

Figure 1 is an elevational view of a baby carriage having the undercarriage constructed in accordance with the present invention, Fig. 2 is an enlarged fragmentary plan view of the undercarriage shown in Fig. 1, Fig. 3 is a vertical sectional view of the undercarriage taken on line 3—3 of Fig. 2, and illustrating the manner in which the parts are moved upon the front wheels striking an obstacle, Fig. 4 is a vertical sectional view of the undercarriage taken on line 4—4 of Fig. 2, Fig. 5 is an enlarged fragmentary plan view of the undercarriage constructed according to a modified form of the invention and employing front and rear sets of single crank arms for the wheels, and Fig. 6 is a vertical sectional view of the undercarriage shown in Fig. 5 and as viewed on line 6—6 thereof.

In carrying the invention into practice, it is preferred to construct the device as depicted in the drawing wherein there is shown a hand pushed vehicle, such as a baby carriage 8, to which is affixed an undercarriage 9. This undercarriage generally comprises a rectangularly shaped frame 10, adapted to be fastened under a baby carriage by any conventional fastening means (not shown). Mounted on said frame in journal bearings 15a, 15b and 16a, 16b are a pair of double crank axles 15 and 16 that extend across the width of the frame and are longitudinally spaced from one another. The axle 15 has crank arms 13 and 13' while the axle 16 has crank arms 14 and 14'. Front wheels 11 are journalled on the crank arms 13 and 13' and rear wheels 12 are journalled on the crank arms 14 and 14'. Spring arms 19 and 20 are rigidly affixed to the respective crank axles 15 and 16 by pins 21, and are located respectively at the respective outer sides of the frame 10. These spring arms extend downwardly from the axle and are parallel to each other. At the outer extremities of the spring arms 19 and 20 at each side of the frame is a tension spring 18, that securely and resiliently connects the two axles together to take up any slack in the parallel linkage connections. The front wheels 11 are located outwardly of the rear wheels 12 so as to give sufficient clearance between the front and rear wheels for one set of wheels to laterally overlie one another. The crank arms 13 and 13' for the wheels extend forwardly from their axle while the crank arms 14 and 14' extend rearwardly from their axle. Fixed to the centers of the respective axles are respective vertically-extending double arms 22 and 23 smaller than one-half the radius of the carriage wheels, and extending both above and below the axles, preferably slightly more above said axle rod than below. The arms above the axles are of equal length and the arms below the axles are likewise of equal length. Parallel links 24 and 25 are connected between the outer extremities of the arms 22 and 23 by pivot pins 26 and run parallel to the ground, and form a parrallelogram linkage interconnecting the axles.

As can be seen from Fig. 3, when the vehicle is traveling along a level path and strikes a curb or step C, the front wheels 11 are lifted by rolling forces and the resultant forces thereof are transmitted through the parallelogram linkage to the rear wheels to depress the same and assume the load, leaving the front wheels without great downward pressure and free to easily traverse the curb or step C. During this motion the crank axle 15 will be rotated counter clockwise to the dash line position of Fig. 3 relative to the body which due to the links 24 and 25 also results in a counter clockwise rotation of the crank axle 16. A similar effect can be had by depressing the rear of the frame 10 by handle 27 to force the front wheel upwardly from the rear wheels. Also by depressing the handle 27 the crank axles 15 and 16 will be rotated counter clockwise to the dash line position, Fig. 3.

As illustrated in Figs. 5 and 6, it is also possible to apply the principles of the invention to undercarriages where the axles are single cranks 43 and 44 and do not go through the undercarriage but where individual crank axles for each wheel are respectively journalled upon the undercarriage by sleeves 46 and 47. Thus, the undercarriage may comprise a rectangular frame 30 having a front pair of crank axles 43 with crank ends 43' on which front wheels 11 may be journalled. A rear pair of crank axles 44 with crank ends 44' are provided on which rear wheels 12 may be journalled. Extending respectively from crank axles 43 are spring arms 49 and from crank axles 44 are spring arms 50. The spring arms 49 and 50 are respectively fixed to the respective crank axles 43 and 44 by pins 56. A tension spring 48 is located at each side of the frame 30 and interconnects each set of arms 49 and 50. The springs 48 counteract the weight of the carriage 8.

Also, fixed to and depending from the respective axles 43 and 44 are respective arms 52 and 53 that have their ends interconnected by a link 54 so as to provide therewith a parallelogram linkage, by which the forces will be transmitted between the wheels at each side of the frame 30 to lift the front wheels over the curb or step C and bring the rear wheels to the base of the curb or step C in the manner as described above in connection with the first form of the invention.

While the present invention has been described in conjunction with preferred embodiments, it is to be understood that modifications and variations may be resorted to without departing from the spirit and scope of the invention, as those skilled in the art will readily understand, and that such modifications and variations are considered to be within the purview and scope of the invention and appended claims.

I claim:

1. In a vehicle undercarriage, a longitudinally-extending horizontal under frame having laterally spaced side portions, double crank axles longitudinally spaced from one another and journalled between the side portions, said crank axles extending in opposed directions relative to each other, said axles having horizontally-extending crank arms on the opposite ends thereof and wheels journalled respectively thereon, vertically-extending double lever arms respectively rigidly fixed to the crank axles intermediate of the crank arms thereof and in parallel relationship to each other, said double lever arms respectively extending substantially the same distance above and below their connection with the axle and parallel links connected respectively between the upper ends of the lever arms and between the lower ends of said arms whereby rotative forces acting on one of the crank axles will be transmitted in equal force and extent to the other crank axle through the parallel links.

2. In a vehicle undercarriage as defined in claim 1, and said crank arms of the front axle extending laterally outwardly beyond the crank arms of the rear axle and said wheels on the crank arms of the front axle lying laterally outwardly beyond the wheels on the rear axle and the wheels of both axles laterally overlying one another.

References Cited in the file of this patent

UNITED STATES PATENTS

| | | |
|---|---|---|
| 1,930,208 | Marcum | Oct. 10, 1933 |
| 2,270,022 | Price | Jan. 13, 1942 |
| 2,363,636 | Bloch et al. | Nov. 28, 1944 |
| 2,525,924 | Margiloff | Oct. 17, 1950 |

FOREIGN PATENTS

| | | |
|---|---|---|
| 475,820 | France | Mar. 30, 1915 |
| 643,407 | Great Britain | Sept. 20, 1950 |
| 378,527 | Italy | Feb. 13, 1940 |